United States Patent [19]

Yamamoto et al.

[11] Patent Number: 5,048,932

[45] Date of Patent: Sep. 17, 1991

[54] TRANSMISSION TYPE LIQUID CRYSTAL DISPLAY DEVICE

[75] Inventors: Kazuko Yamamoto, Osaka; Hideki Matsukawa, Matsubara; Hiroshi Esaki, Neyagawa; Kazushi Nonaka, Katano, all of Japan

[73] Assignee: Matsushita Electric Industrial Co., Ltd., Osaka, Japan

[21] Appl. No.: 445,837

[22] PCT Filed: Mar. 15, 1989

[86] PCT No.: PCT/JP89/00279
§ 371 Date: Nov. 8, 1989
§ 102(e) Date: Nov. 8, 1989

[87] PCT Pub. No.: WO89/08861
PCT Pub. Date: Sep. 21, 1989

[30] Foreign Application Priority Data

Mar. 16, 1988 [JP] Japan ................................ 63-62393
Jan. 24, 1989 [JP] Japan ................................ 1-15332
Jan. 24, 1989 [JP] Japan ................................ 1-15333

[51] Int. Cl.$^5$ .............................................. G02F 1/13
[52] U.S. Cl. .................................. 359/48; 359/89; 359/98
[58] Field of Search ............... 350/345, 349, 331 R, 350/333 (U.S. only), 332

[56] References Cited

U.S. PATENT DOCUMENTS 4,655,553 4/1987 Klein ................................... 350/345
4,842,378 6/1989 Flasck et al. ........................ 350/345

FOREIGN PATENT DOCUMENTS 3442498 5/1986 Fed. Rep. of Germany ...... 350/345
55-126216 9/1980 Japan.

OTHER PUBLICATIONS

Uchida et al, "A Full-Color Matrix Liquid-Crystal Display with Color Layers on the Electrodes," Proceedings of the SID., vol. 24/2, 1983, pp. 163-167.

Primary Examiner—Stanley D. Miller
Assistant Examiner—Ron Trice
Attorney, Agent, or Firm—Stevens, Davis, Miller & Mosher

[57] ABSTRACT

The display device includes two transparent substrates which enclose therebetween a liquid crystal having dichroic dye dissolved therein. A back light source assembly is disposed behind the transparent substrates. A dummy voltage is applied across the liquid crystal even in the non-operating mode in which the back light source assembly is turned off to present no display. Because non-uniform color density and non-uniform luminance distribution are eliminated on the display screen the display device can ensure a high display quality and maintain high reliability over a long period of use.

11 Claims, 7 Drawing Sheets

TRANSMISSION TYPE LIQUID CRYSTAL DISPLAY DEVICE

TECHNICAL FIELD

This invention relates to a transmission type liquid crystal display device of the guest-host type.

BACKGROUND ART

In a liquid crystal display device of the guest-host type, a liquid crystal having dichroic dye dissolved therein is enclosed between two transparent substrates which have been subjected to an aligning treatment. FIG. 1 is a sectional view of a transmission type liquid crystal display device of the guest-host type. A liquid crystal 1 aligned in parallel with transparent substrates 3 turns to be arranged in a direction perpendicular to the transparent substrates 3 when a voltage is applied across transparent electrodes 4. At the same time, the direction of alignment of dichroic dyes 2 dissolved in the liquid crystal 1 changes too. The dichroic dye 2 has different light absorbance factors depending on whether the dichroic dye 2 is aligned in a direction perpendicular to or in parallel with the molecular axis. When a polarizer 5 has an absorption axis 7, the portion of the liquid crystal 1 having the voltage applied thereacross transmits light emitter from back light source 6, while the portion having no voltage applied thereacross does not transmit the light. The above fact can be utilized to display characters, patterns, pictures, etc. When a color filter for three additive primaries is disposed before or behind the liquid crystal panel, the liquid crystal panel can be used as a multicolor or full-color liquid crystal display device.

There was such a problem that, when the liquid crystal panel having the dichroic dye dissolved in the liquid crystal was used over a long period of time with the back light from back light sources being directed thereto, the dichroic dye gradually migrated until the dichroic dye was non-uniformly distributed, resulting in appearance of non-uniform color density and non-uniform luminance distribution on the display screen. It has been experimentally confirmed that, in this case, there is a correlation between the direction of migration of the dichroic dye and the direction of alignment of the dichroic dye.

FIGS. 2 and 3 illustrate the relationship between the direction of rubbing the transparent substrates and the direction of migration of the dichroic dye under a homogeneously aligned condition. In an initial state as shown in FIG. 2, the dichroic dye 2 is uniformly dispersed in the liquid crystal 1. When the back light from the back light source 6 is continuously radiated in a direction 8, the dichroic dye 2 migrates in direction opposite to the rubbing direction of the transparent substrate which is irradiated with the back light, and a non-uniform distribution of the dichroic dye 2 takes place, with the result that the dichroic dye 2 is distributed more in one area but less in the other area. In FIGS. 2 and 3, 9 designates the rubbing direction of the front transparent substrate, and 10 designates the rubbing direction of the back transparent substrate. It has been found out that the direction of migration of the dichroic dye 2 is determined only by the rubbing direction of the irradiated transparent substrate 3 and is not affected by the force of gravity, etc. Further, the migration of the dichroic dye 2 is a phenomenon due to excitation by the light, and such a phenomenon does not occur without irradiation with the light. Irradiation with the light causes migration of the dichroic dye 2 in one direction thereby producing, in the display screen, an area where the dichroic dye 2 is distributed with higher density to provide a low transmittance, and an area where the dichroic dye 2 is distributed with lower density to provide high transmittance. As a result, non-uniform color density and non-uniform luminance distribution appear on the entire display screen, thereby greatly degrading the quality of display.

DISCLOSURE OF THE INVENTION

With a view to solving such a problem, the present invention provides a transmission type liquid crystal display device of the guest-host type whicn provides a display of high quality and ensures the operation with high reliability over a long period of time because no non-uniform color density and no non-uniform luminance distribution appear on its display screen.

The present invention which solves the above problem is featured in that a dummy voltage is applied across a liquid crystal even in a non-operating mode in which back light sources are turned off to present no display.

What is called a dummy voltage is a voltage especially applied to the liquid crystal display device in its non-operating mode and differs from a voltage normally applied for the primary purpose of driving the liquid crystal display device. Such a voltage is referred to hereinafter as a dummy voltage.

Homogeneous alignment, in which the rubbing direction of a back transparent substrate irradiated with the back light from the back light sources is opposite to the rubbing direction of a front transparent substrate arranged on the viewing side, is usually employed in a liquid crystal display device of the guest-host type. As described already, the direction of migration of dichroic dye is determined depending on the rubbing direction of the transparent substrate irradiated with light. Therefore, when, for example, light is radiated from the viewing side, the dichroic dye migrates in the opposite direction. In the non-operating mode in which the back light sources are turned off to present no display on the display screen of the liquid crystal display device, the front transparent substrate on the viewing side is also irradiated to a certain degree with external light such as light from room illumination equipments, solar light, etc. This, in the liquid crystal panel in which the dichroic dye has migrated once in one direction due to irradiation with the light from the back light and non-uniform distribution of the dichroic dye has occurred giving rise to non-uniform color density and non-uniform luminance distribution, the dichroic dye will migrate in the opposite direction under the influence of the external light radiation when the back light sources have been turned off, and this migration of the dichroic dye in the opposite direction will act to cancel the non-uniform color density and non-uniform luminance distribution caused by the non-uniform distribution of the dichroic dye. However, since the intensity of the back light irradiation is generally stronger, the non-uniform color density and non-uniform luminance distribution caused by the non-uniform distribution of the dichroic dye will be progress during actual use, and the quality of display will be correspondingly degraded. It has been discovered that the rate of migration of the dichroic dye is accelerated when a voltage is applied across the liquid crystal as compared with a case where no voltage is applied thereacross. By utilizing the above-mentioned fact, a dummy voltage is applied across the liquid crystal even in the non-operating mode where the back light sources are turned off, thereby accelerating migration of the dichroic dye in the opposite direction, whereby the migration caused by irradiation with the back light and the migration caused by irradiation of the front transparent substrate with the external light are balanced, thereby preventing occurrence of the non-uniform color density and non-uniform luminance distribution due to the non-uniform distribution of the dichroic dye caused by migration of the dichroic dye in one direction. Thus, it is possible to realize a liquid crystal display device of the guesthost type which can maintain its initial state of providing a display of high quality and which can operate with high reliability over a long period of time.

BEST MODE FOR CARRYING OUT THE INVENTION

Embodiments of the present invention will now be described with reference to the drawings.

Embodiment 1

Figure 1:
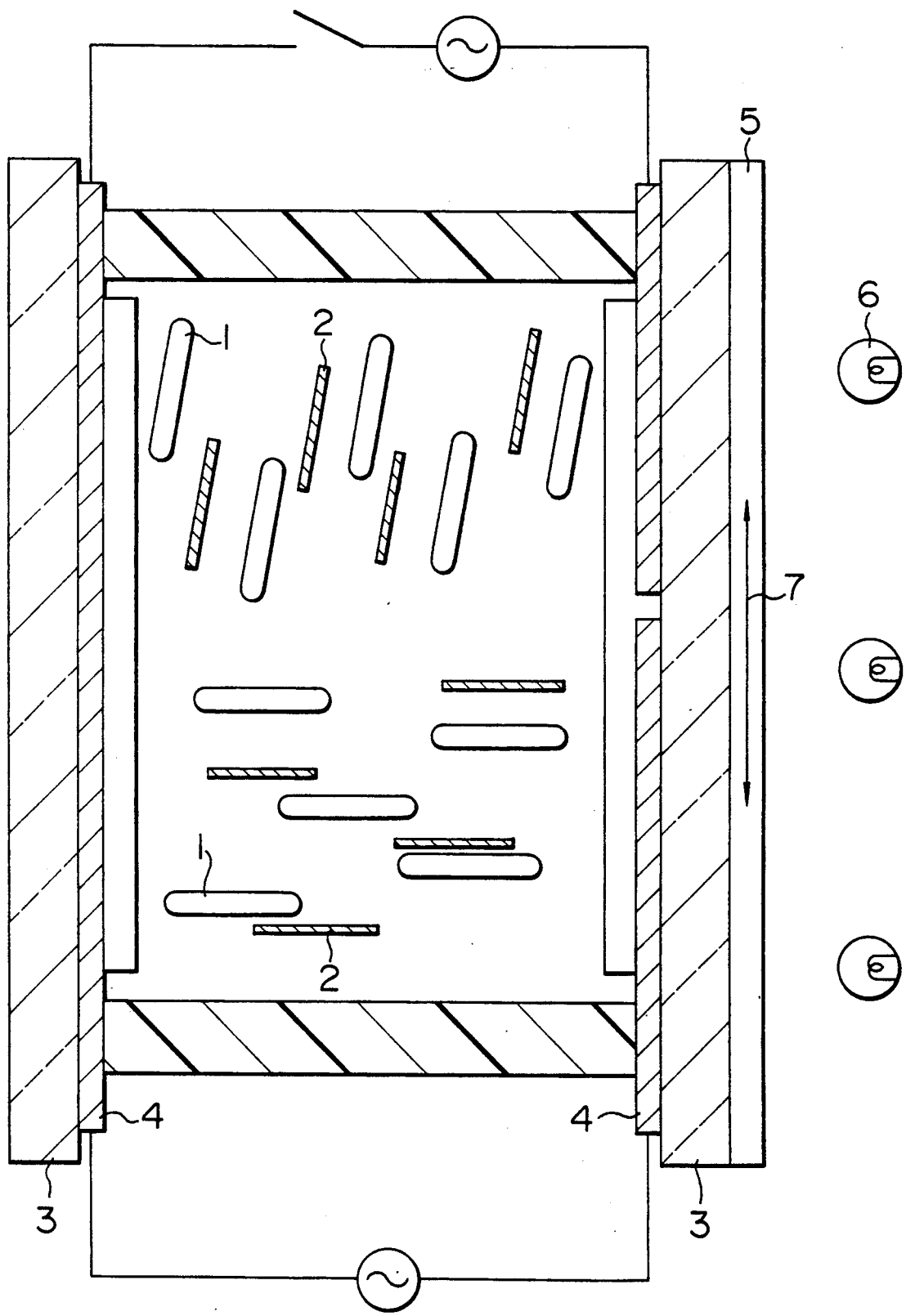
FIG. 1 is a sectional view of a transmission type liquid crystal display device of the guest-host type.
Figure 2:
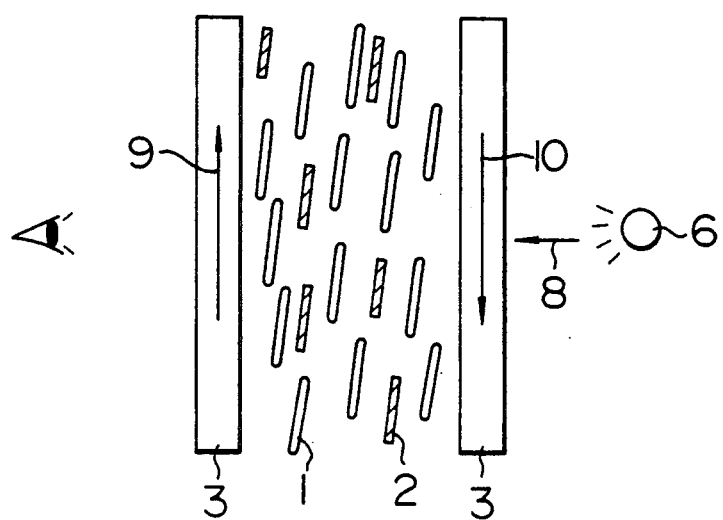
FIGS. 2 and 3 illustrate the rubbing directions of the transparent substrates, the direction of back light from the back light sources and the direction of migration of the dichroic dye in the transmission type liquid crystal display device of the guest-host type.
Figure 3:
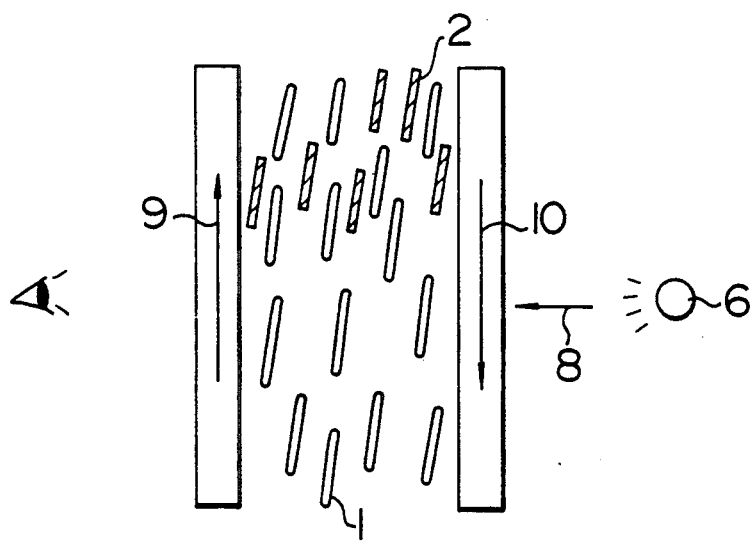
Figure 4:
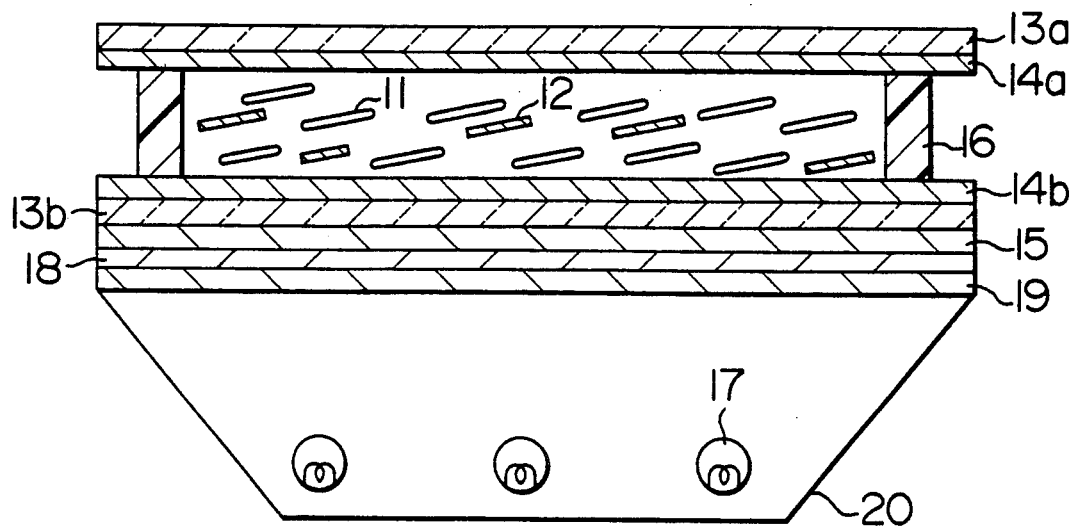
FIG. 4 is a sectional view of a transmission type liquid crystal display unit of Embodiment 1 of the invention.
Figure 5:
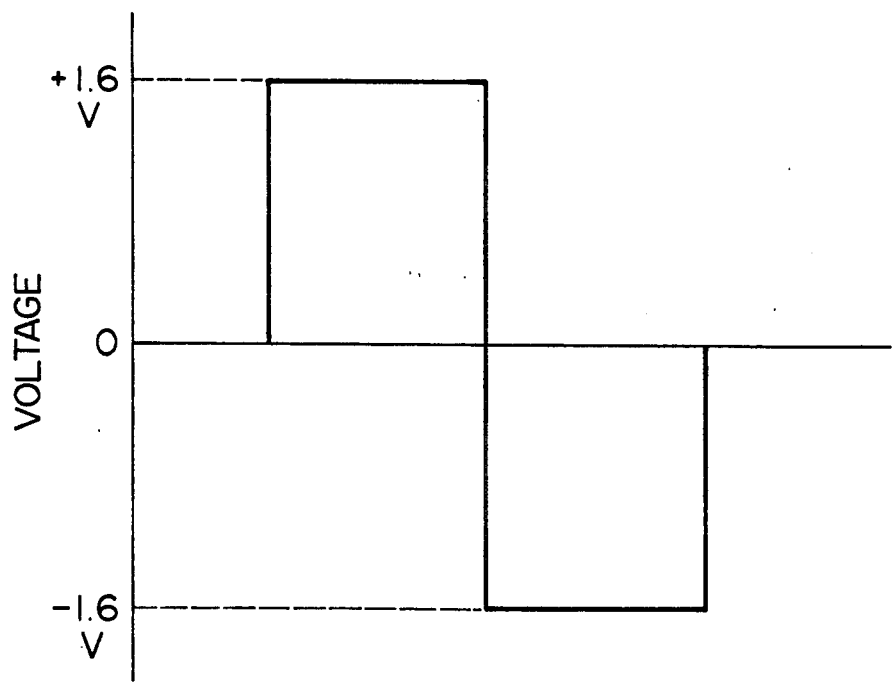
FIG. 5 is a waveform diagram of the dummy voltage in Embodiment 1.

1.0 wt% of a quinophthalein type yellow dichroic dye, 1.2 wt% of an azo type magenta dichroic dye and 2.0 wt% of an anthraquinone type blue dichroic dye were dissolved in a nematic liquid crystal (ZLI-1840 produced by Merk Co.), and the mixture was enclosed in a cell which has been subjected to homogeneous alignment and which has a gap of 10 μm as shown in FIG. 1. In FIG. 4, 11 designates the liquid crystal, 12 designates the dichroic dye, 13a and 13b designate transparent substrates, and 14a and 14b designate transparent electrodes. The transparent electrode 14b was formed on the entire surface of the back transparent substrate 13b, while the transparent electrode 14a was formed in a static dot pattern on the front transparent substrate 13a. A polarizer 15 was disposed on the back transparent substrate 13b in such a relation that the absorption axis of the dichroic dye 12 was perpendicular to the polarization axis of the polarizer 15, and a color filter 18 having three additive primaries was arranged so that the pattern of R, G and B be in register with the dot pattern of the transparent electrode 14a. The light emitted from back light sources 17 was radiated through a diffusion plate 19. 16 designates a sealing member for sealing the gap between the transparent substrates 13a and 13b, and 20 designates a reflection plate disposed behind the back light sources 17. The back light sources 17 irradiating the cell were turned on and off at the time interval of 12 hours. While the back light sources 17 were in the on state, a TV picture signal was applied to represent an operating mode. A comparison was made between two states while the back light sources 17 are in the off state. In one of the two states, a dummy voltage of 1.6 V having a rectangular waveform of 60 Hz was applied, while, in the other one of the two states, no dumby voltage was applied. In the off state of the back light sources 17, external light from the indoor lighting equipment irradiated the viewing side. FIG. 5 is a waveform diagram showing the waveform of the dummy voltage.

Figure 6:
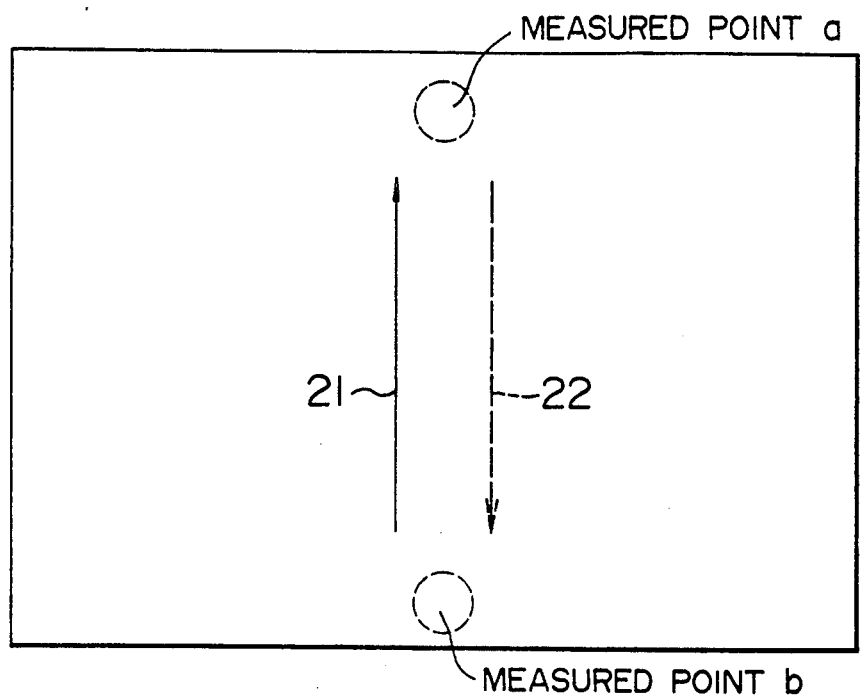
FIG. 6 is a front elevational view of the transmission type liquid crystal display unit.

FIG. 6 is a front elevational view of the liquid crystal display unit of the present embodiment. In FIG. 6, 21 designates the rubbing direction of the transparent substrate 13a, and 22 designates the rubbing direction of the transparent substrate 13b. The resultant transmittance for the wavelength of 550 nm measured at two points a and b of the cell, after the liquid crystal display unit was used for 500 hrs, are shown in Table 1.

TABLE 1

| Non-operating mode | Measured point | Transmittance (%) Initial value | Value after 500 hrs |
|---|---|---|---|
| Voltage applied | a | 0.13 | 0.12 |
|  | b | 0.13 | 0.14 |
| Voltage not applied | a | 0.13 | 0.08 |
|  | b | 0.13 | 0.40 |

It can be seen that, in the non-operating mode in which the back light sources are turned off, the difference between the transmittance at the measured point a and those at the measured point b in the case where the dummy voltage is applied, is smaller as compared with that in the case where the dummy voltage is not applied. That is, this means that the non-uniform color density caused by the non-uniform distribution of the dichroic dye in the cell could be prevented by the application of the dummy voltage.

Embodiment 2

Figure 7:
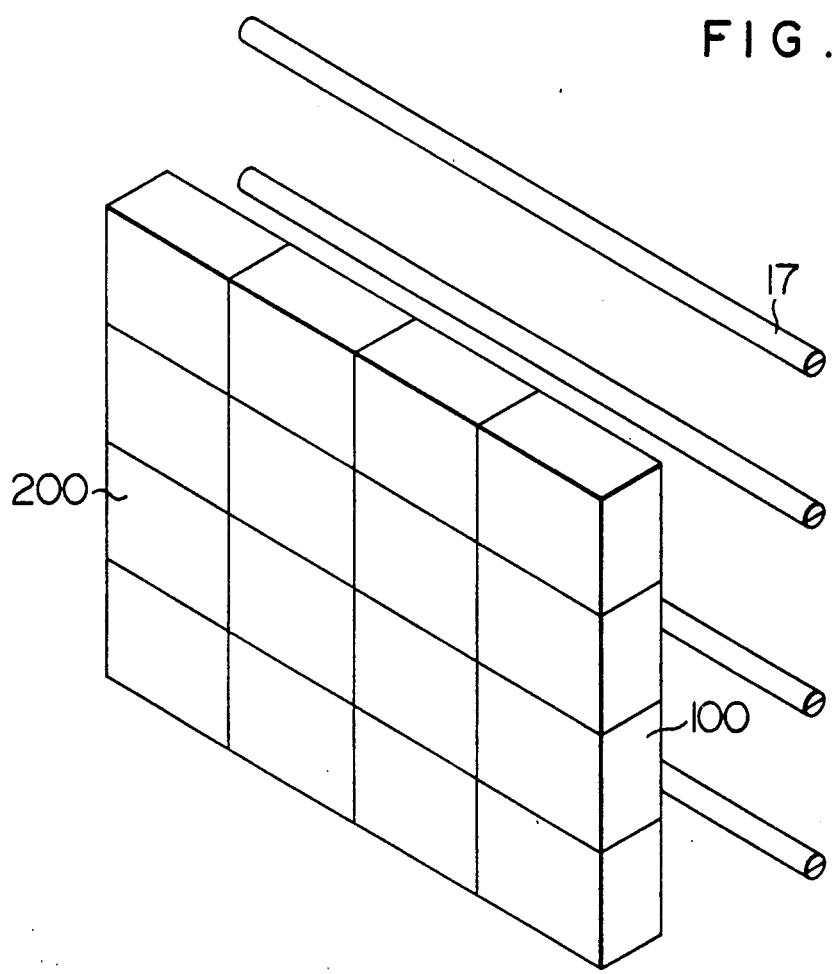
FIG. 7 is a perspective view showing a large-sized liquid crystal display device of Embodiment 2 of the present invention.

FIG. 7 is a perspective view of a large-sized liquid crystal display de ice constituted by arraying, on the same plane, sixteen transmission type liquid crystal display units of Embodiment 1 shown in FIG. 4. In FIG. 7, 100 designates each of the transmission type liquid crystal display units, 200 designates the display screen, and 17 designates the back light sources.

It was assumed that this large-sized liquid crystal display device is used for 12 hrs per day, and the power supply for the back light sources 17 was turned on and off at the time interval of 12 hrs. A TV picture signal was applied in the on state of the back light sources 17 to represent an operating mode, while, the off state of the back light sources 17 was deemed to represent a non-operating mode. In the non-operating mode in which the back light sources 17 were in the off state, a rectangular waveform voltage of 1.6 V and 60 Hz as shown in FIG. 5 was applied as the dummy voltage. The value of maximum luminance of each picture element in the large-sized liquid crystal display device was 600 nits at 10 V, and the value of luminance at 1.6 V was 300 nits which value corresponds to 50% of the maximum luminance value. The luminance of the display screen, after the large-sized liquid crystal display device of this embodiment was used for 1,000 hrs, was measured in the state where no voltage was applied. The measurement results at the points of measurement a and b, after the device of this embodiment was used for 1,000 hrs, and, for the sake of comparison, the measurement results at the similar two points of the transmission type liquid crystal display unit, after it was used for 1,000 hrs without application of the dummy voltage in the nonoperating mode, are shown in Table 2.

TABLE 2

| Non-operating mode | Measured point | Luminance (nit) | |
|---|---|---|---|
| | | Initial value | Value after 1,000 hrs |
| Voltage applied | a | 16 | 17 |
| | b | 16 | 16 |
| Voltage not applied | a | 16 | 25 |
| | b | 16 | 13 |

It can be seen that, in the case of the present embodiment in which the rectangular waveform voltage of 1.6 V and 60 Hz is applied as the dummy voltage in the non-operating mode where the back light sources are turned off, it is difficult for a non-uniform luminance distribution to be produced even after the use for 1,000 hrs, as compared with the case where the dummy voltage is not applied. This means that the uniform distribution of the dichroic dyes could be prevented by the application of the dummy voltage. Also, upon observation by the naked eye, non-uniform color density could hardly be perceived. These facts prove that the application of the dummy voltage in the non-operating mode was effective.

Figure 8:
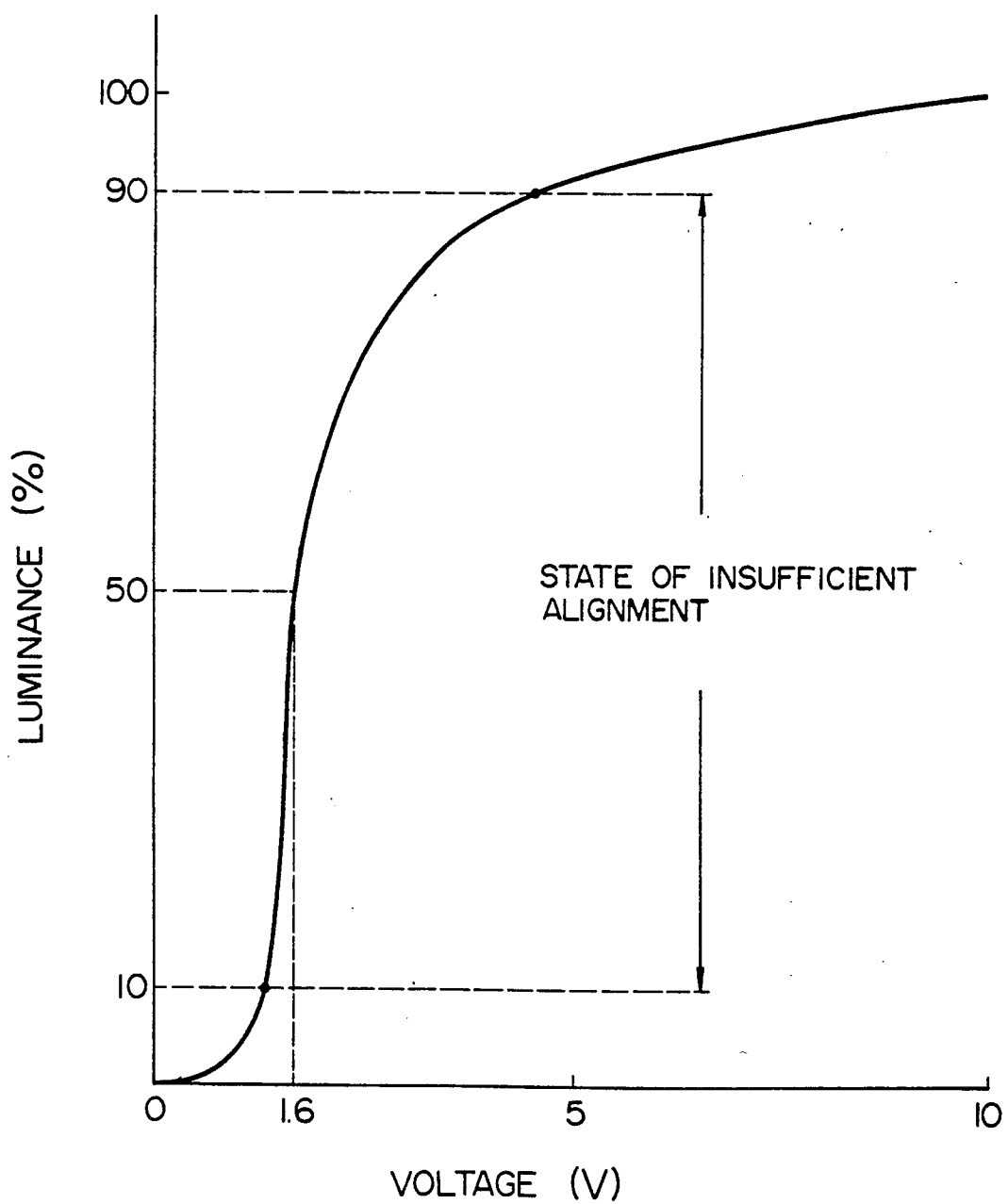
FIG. 8 is a characteristic diagram showing the relation between the voltage and the luminance.

In the present embodiment, a rectangular waveform voltage of 1.6 V and 60 Hz which provides a luminance value as large as 50% of the maximum luminance value was used as the dummy voltage. However, a voltage, which able to provide such an effect, is not specifically limited to such a voltage described above. It has been experimentally clarified that migration of the dichroic dye tends to conspicuously occur when the liquid crystal molecules are in the state of insufficient alignment. FIG. 8 shows the relationship between the voltage and the luminance in the liquid crystal display unit of this embodiment. It will be seen from FIG. 8 that migration of the dichroic dye tends to occur most conspicuously within the luminance range of 10 to 90% where the liquid crystal molecules are in the state of insufficient alignment, and a sufficiently satisfactory effect is obtained when a voltage within this range is used as the dummy voltage. It has been found that the voltage range, which provides the luminance of 40 to 60%, is especially effective as compared with other voltage ranges.

Embodiment 3

Similarly to the case of Embodiment 2, it was assumed that the large-sized liquid crystal display device described above is used for 12 hrs per day. The power supply of the back light sources was turned on and off at the time interval of 12 hrs. In the on state of the back light sources 17, a television (TV) picture signal was used to represent the operating mode, and the off state of the back light sources 17 was deemed to represent the non-operati-g mode. In the large-sized liquid crystal display de ice of Embodiment 3, a satellite broadcasting signal was received, and this signal was applied to the large-sized liquid crystal display device as a picture signal for providing the dummy voltage. After the large-sized liquid crystal display device of this embodiment was used for 1,000 hrs, the luminance of the display screen was measured in a manner similar to the measurement performed in Embodiment 3. The measurement results are shown in Table 3.

TABLE 3

| Non-operating mode | Measured point | Luminance (nit) | |
|---|---|---|---|
| | | Initial value | Value after 1,000 hrs |
| Satellite broadcasting signal applied | a | 16 | 17 |
| | b | 16 | 17 |
| Voltage not applied | a | 16 | 25 |
| | b | 16 | 13 |

It can be seen rhat, in the case of the present embodiment in which the received satellite broadcasting signal is used as the duty voltage in the non-operating mode where the back light sources are turned off, non-uniform luminance distribution hardly appears even after the use for 1,000 hrs, as compared with the case where the dummy voltage is not applied. This means that the non-uniform distribution of the dichroic dyes can be prevented by the application of the picture signal as the dummy voltage. Also, upon observation by the naked eye almost no non-uniform color density was perceived. These facts prove that the application of the picture signal was effective.

In the present embodiment, the received satellite broadcasting signal was used as the picture signal to be used as the dummy voltage. This is because the satellite broadcasting signal can be used continuously. The signal which is able to provide such an effect is in no way limited to the satellite broadcasting signal, and the similar effect can also be obtained by the application of a picture signal which has mainly a medium tone. The picture signal in this case refers to a moving picture signal having gradation as that of a TV signal but it does not refer to any specific invariant still picture signal. In the case of the transmission type liquid crystal display device having a function of displaying a picture signal reproduced from a TV of a video tape recorder, such a picture signal can be readily used as the dummy voltage in the non-operating mode of the liquid crystal display device, and with such a method it is possible to effectively prevent non-uniform color density and non-uniform luminance distribution caused by the non-uniform distribution of the dichroic dye.

Embodiment 4

Figure 9:
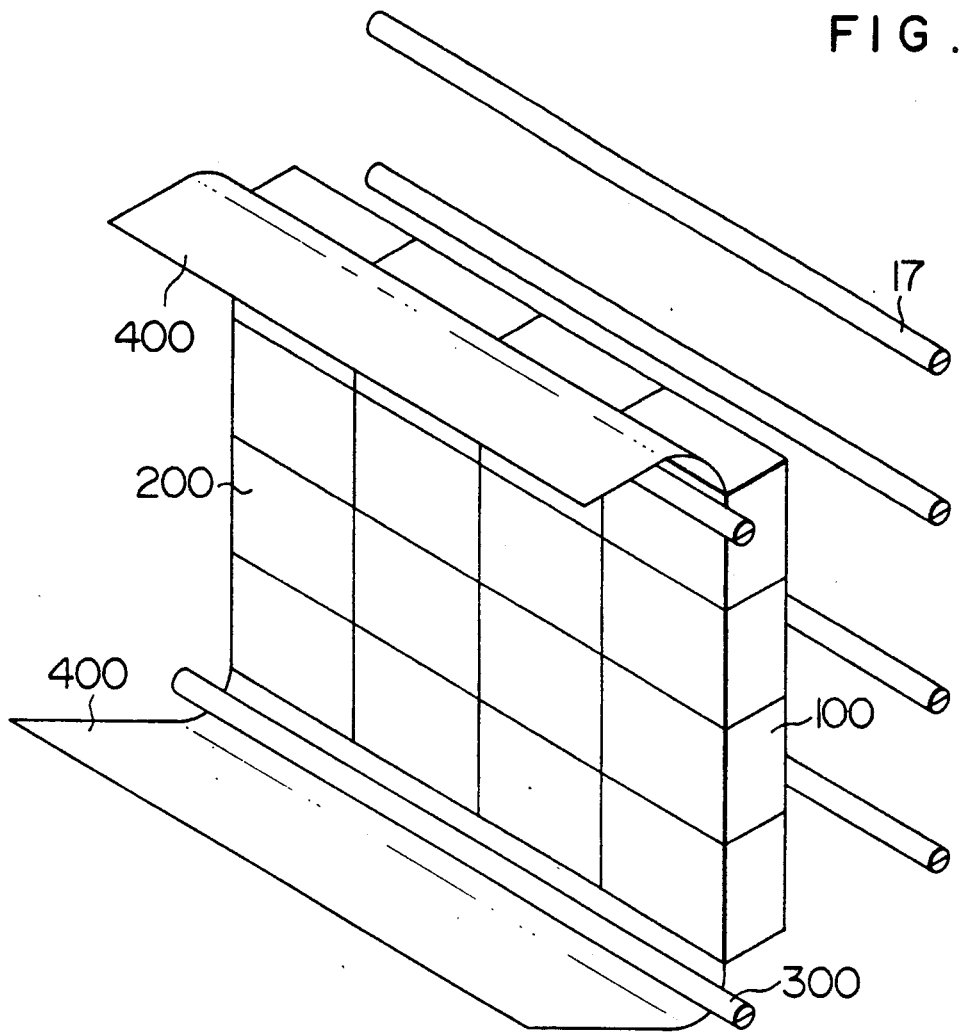
FIG. 9 is a perspective view showing a large-sized liquid crystal display device of Embodiment 4 of the present invention.
Figure 10:
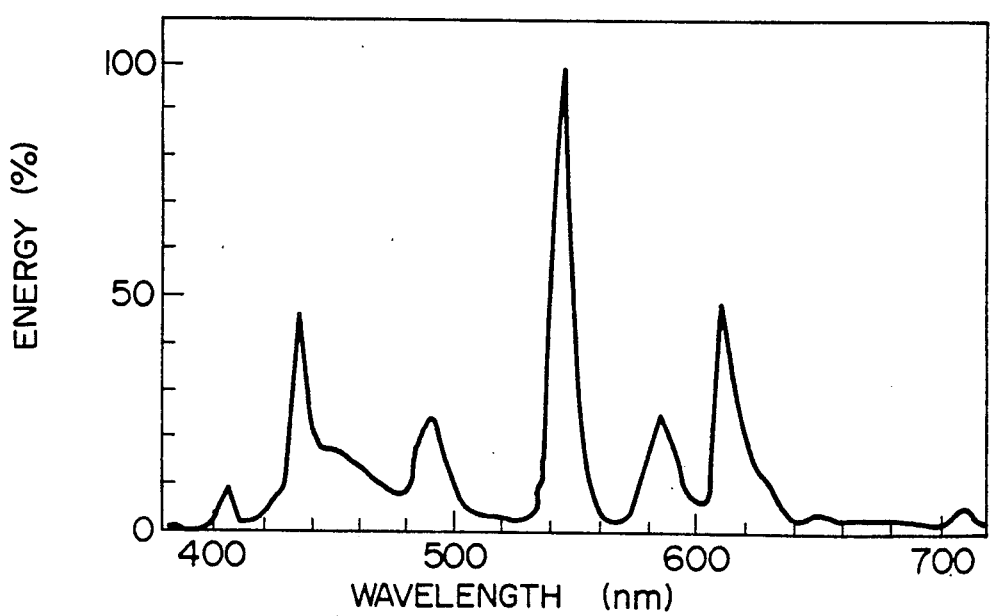
FIG. 10 is a wavelength characteristic diagram of a three-wavelength fluorescent lamp.

FIG. 9 shows a large-sized liquid crysta display device in which light sources for irradiating the above-described large-sized liquid crystal display device from the front side are provided.

In FIG. 9, 100 designates each of the transmission type liquid crystal display units described already, 200 designates the display screen, 300 designates front light sources for irradiating the units 100 from the front side, and 400 designates a front reflector plates. Three-wavelength fluorescent lamps were used as both the back light sources 17 and the front light sources 300.

It was assumed that this large-sized liquid crystal display device is used for 12 hrs per day. The power supply of the back light sources was turned on and off at the time interval of 12 hrs. In the on state of the back light sources 17 a TV picture signal was applied to represent the operating mode. The off state of the back light 17 was deemed to represent the non-operating mode, and the lght from the front light source 300 was used to irradiate the display screen from the front side. In this case the illuminance of the back light sources 17 was 30,000 lxs. However, the illuminance at the panel surface was 5,000 lxs because of the presence of the color filter 18 between the back light sources and the panel surface. In this case, the illuminance of the front light sources was 5,000 lxs at the front panel surface.

After the large-sized liquid crystal display device of this embodiment was used for 1,000 hrs, the luminance at the display screen was measured in a inner similar to the measurement performed in the above-mentioned embodiments. The measurement results are shown in Table 4.

TABLE 4

| Non-operating mode | Measured point | Luminance (nit) | |
|---|---|---|---|
| | | Initial value | Value after 1,000 hrs |
| With irradiation by front light sources | a | 16 | 17 |
| | b | 16 | 16 |
| Without irradiation by front light sources | a | 16 | 25 |
| | b | 16 | 13 |

It can be seen that, when the device of the present embodiment is irradiated with light from the front light sources in the non-operating mode where the back light sources are turned off, non-uniform luminance distribution hardly appears even after the use of the device for 1,000 hrs, as compared with the case where the device is not irradiated with light from the front light sources. This means that the migration of the dichroic dye was balanced by the irradiation with light from the front light sources and non-uniform distribution of the dichroic dyes could be prevented. Also, upon observation by the naked eye, the presence of non-uniform color density was hardly perceived. These facts prove that the irradiation from the front side was effective.

Embodiment 5

Figure 11:
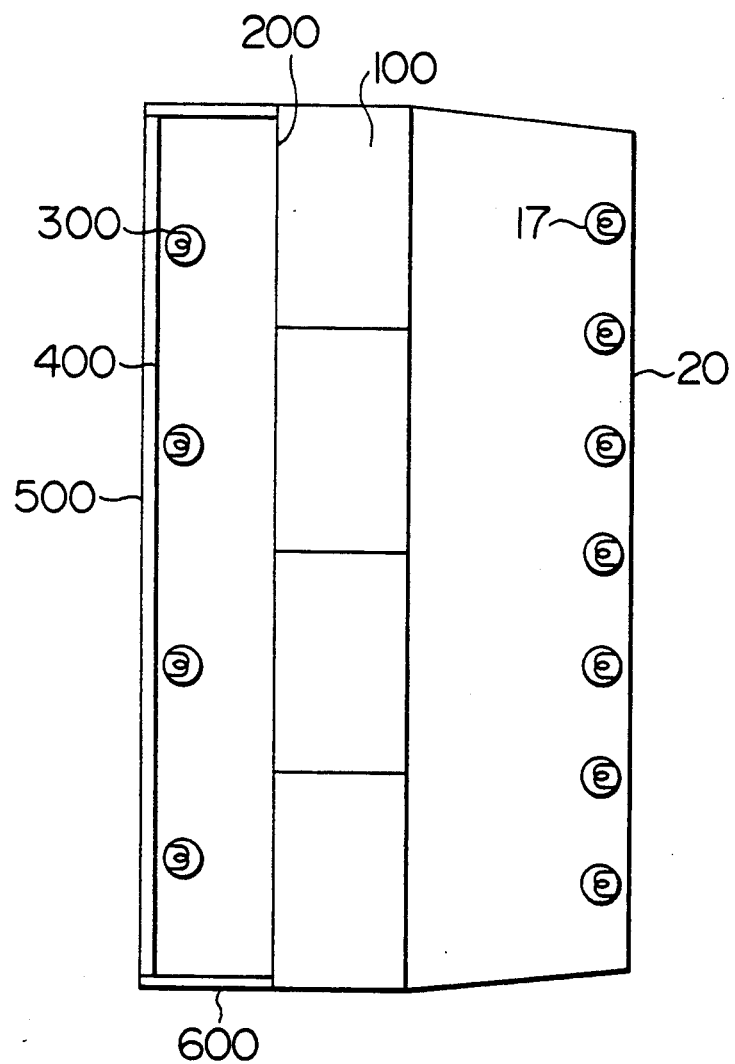
FIG. 11 is a schematic view showing a large-sized liquid crystal dispaly device of Embodiment 5 of the present invention.

FIG. 11 is a schematic view showing a large-sized liquid crystal dispiay device of another embodiment of the present invention. In FIG. 11, 100 designates each of the individual transmission type liquid crystal display units, and the structure of each of the units is the same as that of Embodiment 1 shown in FIG. 4. 500 designates a shutter which covers the entire display screen in the non-operating mode. In the non-operating mode, a front reflector plate 400 disposed on the inner side of the shutter 500 cooperates with front light sources 300 to irradiate the display screen 200. 600 designates a shutter holder. Three-wavelength fluorescent lamps, which are the same as those employed in Embodiment 4, were used as both the back light sources 17 and the front light sources 300.

This transmission type liquid crystal display device was continuously used for 8 hrs per day from 9:00 a.m. to 5:00 p.m. by turning on the power supply of the back light sources 17. In the remaining time period, in which the device was kept in its non-operating mode by turning off the back light sources 17, the shutter 500 covered the display screen 200 and the entire display screen was irradiated with light from the front light sources 300. In the operating mode, a TV picture signal was applied, while, in the non-operating mode, no voltage was applied. The illuminance of the back light sources 17 was 30,000 lxs, but tne illuminance at the panel surface was 5,000 lxs because of the presence of a color filter between the back light sources and the panel surface. Further, the illuminance of the front light sources was 3,000 lxs at the front panel surface.

After the large-sized liquid crystal display device of this embodiment was used for 1,000 hrs, the luminance at the display screen was measured in a manner similar to the measurement performed in Embodiment 1. The measurement results are shown in Table 5.

TABLE 5

| Non-operating mode | Measured point | Luminance (nit) | |
|---|---|---|---|
| | | Initial value | Value after 1,000 hrs |
| With irradiation by front light sources | a | 16 | 17 |
| | b | 16 | 17 |
| Without irradiation by front light sources | a | 16 | 26 |
| | b | 16 | 12 |

It can be seen that, when the device of the present embodiment is irradiated with light from the front light sources in the non-operating mode where the back light sources are turned off, non-uniform luminance distribution hardly appears even after the use of the device for 1,000 hrs, as compared with the case where the device is not irradiated with light from the front light sources. Therefore, the irradiation with light from the front light sources is effective in the present embodiment.

In order to effectively irradiate the entire display screen, it is necessary to dispose the front light sources on the front side of the display screen. However, there are such problems that, if the front light sources are disposed at any inappropriate position, a viewed would feel difficulty in clearly viewing the display screen, and also that it is not easy to find a suitable place where the front light sources are to be arranged, because if the front light sources are located in the field of vision of the viewer in the operating mode of the device, it would make an undesirable external appearance of the device. However, according to the arrangement of the present invention, the front light sources are not located in the field of vision of the viewer in the operating mode of the device, so that they do not disturb the viewer in viewing the display screen. Further, because external leakage of irradiating light emitted from the front light sources can be prevented even in the operating mode of the device, unnecessary external irradiation of light from the front light sources can be avoided. The provision of the reflector plate on the back side of the shutter is effective in that light can be efficiently utilized to irradiate the entire display screen.

In the present embodiment, three-wavelength fluorescent lamps are used as both the back light sources and the front light sources. Generally, in the case of making a color display, a light source for emitting light including three wavelengths of R, G and B such as that employed in the present embodiment is used as the back light sources in displaying three additive primaries. However, the front light sources for irradiating light from the front side are not necessarily limited to the three-wavelength fluorescent lamps. As described already, the non-uniform distribution of the dichroic dye due to the migration thereof is caused by light energy. That is, this means that migration of the dichroic dye can be caused by the irradiation of light belonging only to the absorption wavelength range of the dichroic dyes. Thus, it can be seen that a desired effect can be obtained if only the front light sources are formed of a light source which emits light falling in the absorption wavelength range of the migrating dichroic dye. Either light belonging only to the absorption wavelength range of the dichroic dye or light covering the full wavelength range such as white light may be used. If the absorption wavelength range of the migrating dichroic dye can be specified, it is effective to use light belonging only to such specified range. The quantity of light irradiation from the front side is effectively selected so that the integrated quantity of light in the absorption wavelength range of the migrating dichroic dye is approximately equal to or more than that of the back light. In the present embodiment in which the same light sources are employed, the absorption wavelength range are also the same. In Embodiment 4, the integrated quantity of light per day of both the back light and the front light are the same and amount to 60,000 lx·hrs. However, it is known that the rate of migration of the dichroic dye is also affected by the voltage applied at the time of light irradiation and so on in addition to the quantity of light, and it is also known that the rate of migration is faster when the voltage is applied than when the voltage is not applied. Considering that the voltage is applied in the operating mode, it is considered to be effective that the integrated quantity of light from the front light sources in the non-operating mode exceeds that of the back light sources. In Embodiment 5, the integrated quantity of light per day of the back light was set at 40,000 lx·hrs, while the integrated light quantity of the front light was set at 48,000 lx·hrs. Because the rate of migration varies depending on the voltage applied in the operating mode, it is desirable to determine an amount of the light quantity of the front light accordingly. Further, if the rate of migration of the dichroic dye due to irradiation with light from the front light sources is accelerated by applying the dummy voltage in the non-operating mode, the similar effect can be obtained with a smaller quantity of front light. The dummy voltage referred to here is a voltage especially applied to the liquid crystal display device in a non-operating mode thereof and it differs from a voltage applied for the primary purpose of driving the liquid crystal display device.

Liquid crystals having such an effect are not especially limited, and an effect similar to that described above is obtained by the use of various kinds of liquid crystals, for example, those of the type such as the Schiff's base type, azo type, azoxy type, phenylcyclohexane type, cyclohexyl ester type, biphenyl type, terphenyl type, dioxane type and pyrimidine type or their mixtures. Also, there is not any especial limitation on the kind of dichroic dye employed and an effect similar to that described above is obtained by the use of a dichroic dye of the quinophthalein type, perylene type, azo type, azomethine type, anthraquinone type, indigoid type, etc., namely, those generally used in liquid crystals of the guest-host type. the effect of the present invention is obtained in all of the transmission type liquid crystal display devices of the guest-host type. Especially, in the case of a large-sized liquid crystal display device constructed by arraying many liquid crystal panels on the same plane, since non-uniform color density and non-uniform luminance distribution occurring in the panels are apt to create a problem of conspicuous non-uniformity defects occurring on the entire display screen, the present invention is especially effectively applicable to such a device.

The present invention has a similar effect not only on the liquid crystal display device of the guest-host type, but also on liquid crystal display devices in which dichroic dye is dissolved in a liquid crystal, for example, a liquid crystal display device in which dichroic dye is used for the purpose of lowering the transmittance and improving the display quality.

INDUSTRIAL APPLICABILITY

It will be understood from the foregoing description that the present invention can provide a transmission type liquid crystal display device of the guest-host type having high display quality and ensuring long-term reliability, in which non-uniform color density and non-uniform luminance distribution are prevented from occurring on the display screen by applying a dummy voltage even in a non-operating mode of the device where the back light sources are turned off and no display is presented on the display screen.

We claim:

1. A transmission type liquid crystal display device comprising two transparent substrates which have been presubjected to an aligning treatment by a rubbing technique and which are disposed in opposed relationship to one another; a liquid crystal which has dichroic dye dissolved therein and which is enclosed between said transparent substrates; at least one back light source disposed behind said transparent substrates; and means for applying a dummy voltage across said liquid crystal when said back light sources are turned off to present no display on a display screen of said liquid crystgal display device.

2. A transmission type liquid crystal display device according to claim 1, wherein said dummy voltage has a value to make a time-average value of luminance of each picture element fall within a range of 10 to 90% of the value of maximum luminance thereof.

3. A transmission type liquid crystal display device according to claim 1, wherein a picture signal is used as said dummy voltage.

4. A transmission type liquid crystal display device according to claim 1, wherein the front side of the display screen is illuminated by a light beam when said back light source is turned off to present no display on the display screen.

5. A transmission type liquid crystal display device comprising two transparent substrates which have been presubjected to an aligning treatment by a rubbing technique and which are disposed in opposed relationship to one another; a liquid crystal which has dichroic dye dissolved therein and which is enclosed between said transparent substrates; at least one back light source disposed behind said transparent substrates; a display screen; and a shutter covering an entire front side of the display screen and having at least one front light source mounted thereon to thereby illuminate the display screen, when said back light source is turned off to present no display on the display screen, respectively, so that the front light source emits illuminating light only when no display is presented on the display screen.

6. A transmission type liquid crystal display device comprising two transparent substrates which have been presubjected to an aligning treatment by a rubbing technique and which are disposed in opposed relationship to one another; a liquid crystal which has a dichroic dye dissolved therein and which is enclosed between said transparent electrodes; at least one back light source disposed behind said transparent substrates; means for applying a dummy voltage across said liquid crystal when said back light source is turned off to present no display on a display screen of said liquid crystal display device; and at least one front light source to illuminate a front side of the display screen only when said back light source is turned off to present no display on the display screen.

7. A transmission type liquid crystal display device according to claim 6, wherein said dummy voltage has a value to make a time-average value of luminance of each picture element fall within a range of 10 to 90% of the value of maximum luminance thereof.

8. A transmission type liquid crystal display device according to claim 6, wherein a picture signal is used as said dummy voltage.

9. A transmission type liquid crystal display device comprising two transparent substrates which have been presubjected to an aligning treatment by a rubbing technique and which are disposed in opposed relationship to one another; a liquid crystal which has dichroic dye dissolved therein and which is enclosed between said transparent electrodes; at least one back light source disposed behind said transparent substrates; a display screen; means for applying a dummy voltage across said liquid crystal; a shutter disposed at a front side of said liquid crystal display device to cover an entire front side of the display screen; and at least one front light source mounted thereon to thereby illuminate the display screen, when said back light source is turned off to present no display on the display screen, respectively, so that said front light source emits illuminating light and said dummy voltage is applied only when no display is present on the display screen.

10. A transmission type liquid crystal display device according to claim 9, wherein said dummy voltage has a value to make a time-average value of luminance of each picture element fall within a range of 10 to 90% of the value of maximum luminance thereof.

11. A transmission type liquid crystal display device according to claim 9, wherein a picture signal is used as said dummy voltage.

* * * * *